United States Patent
Bircher

(10) Patent No.: US 10,455,812 B1
(45) Date of Patent: Oct. 29, 2019

(54) PET EXCREMENT CATCHER

(71) Applicant: Andrew Bircher, Cincinnati, OH (US)

(72) Inventor: Andrew Bircher, Cincinnati, OH (US)

( * ) Notice: Subject to any disclaimer, the term of this patent is extended or adjusted under 35 U.S.C. 154(b) by 0 days.

(21) Appl. No.: 16/237,826

(22) Filed: Jan. 2, 2019

(51) Int. Cl.
  *A01K 29/00* (2006.01)
  *A01K 23/00* (2006.01)
  *E01H 1/12* (2006.01)

(52) U.S. Cl.
  CPC .... *A01K 23/005* (2013.01); *E01H 2001/1266* (2013.01)

(58) Field of Classification Search
  CPC .. A01K 23/005; E01H 1/1206; E01H 1/1213; E01H 2001/1266; E01H 2001/1293
  USPC .......................................... 294/1.3, 1.4, 1.5
  See application file for complete search history.

(56) References Cited

U.S. PATENT DOCUMENTS

| | | | | |
|---|---|---|---|---|
| 5,683,129 | A * | 11/1997 | Jensen | A01K 23/005 294/1.5 |
| 6,149,214 | A * | 11/2000 | Kipka | A01K 23/005 294/1.5 |
| 7,618,073 | B2 * | 11/2009 | Casper | A01K 23/005 248/101 |
| 7,854,455 | B2 | 12/2010 | Ruscil | |
| 8,511,728 | B2 | 8/2013 | Beaton | |
| 9,131,661 | B2 | 9/2015 | Spandau | |
| 9,420,762 | B2 * | 8/2016 | Brasuel | A01K 23/005 |
| 9,668,457 | B1 * | 6/2017 | Irons | A01K 23/005 |
| D795,510 | S | 8/2017 | Griffin | |
| 9,828,734 | B1 * | 11/2017 | Bieberstein | E01H 1/1206 |
| 2002/0096895 | A1 | 7/2002 | McCarthy | |
| 2006/0001281 | A1 | 1/2006 | Hubert | |
| 2007/0029828 | A1 | 2/2007 | Pilas | |
| 2007/0176444 | A1 | 8/2007 | Pilas | |
| 2008/0098959 | A1 * | 5/2008 | Iarrusso | A01K 23/005 119/161 |
| 2009/0045639 | A1 * | 2/2009 | Shalhoub | A01K 23/005 294/1.5 |
| 2009/0096227 | A1 * | 4/2009 | Pender | A01K 23/005 294/1.5 |
| 2011/0057463 | A1 | 3/2011 | Chen | |
| 2013/0082470 | A1 | 4/2013 | Seiko | |
| 2015/0102617 | A1 * | 4/2015 | Pluta | E01H 1/1206 294/1.4 |

\* cited by examiner

*Primary Examiner* — Dean J Kramer
(74) *Attorney, Agent, or Firm* — Kyle A. Fletcher, Esq.

(57) ABSTRACT

The pet excrement catcher is configured for use with a companion animal. The pet excrement catcher is a device for capturing an elimination from the companion animal. The pet excrement catcher comprises an extension shaft, a capture structure, a hinge mechanism, and a grip. The extension shaft is an extension apparatus. The extension shaft is an adjustable structure such that the reach of the pet excrement catcher between a client and the companion animal is adjustable. The capture structure, the hinge mechanism, and the grip attach to the extension shaft. The capture structure is a mechanical structure used to collect the elimination from the companion animal. The hinge mechanism is a mechanical device that controls the operation of the capture structure. The grip is an accommodation that allows the user to manipulate the pet excrement catcher. The grip further illuminates the area around the companion animal.

16 Claims, 5 Drawing Sheets

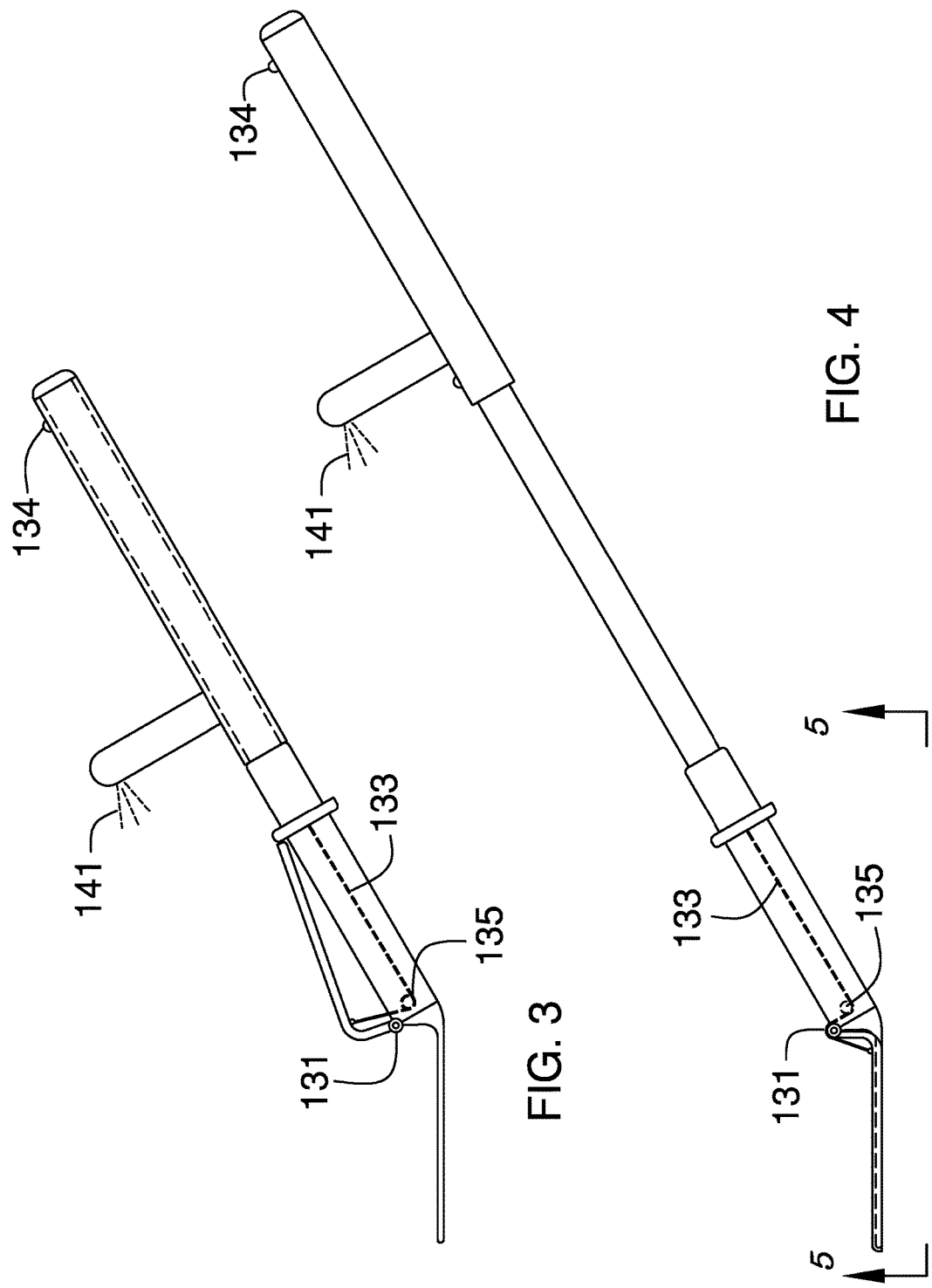

PET EXCREMENT CATCHER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and animal husbandry, more specifically, a manure collecting device operated independently from the animal.

SUMMARY OF INVENTION

The pet excrement catcher is configured for use with a companion animal. The pet excrement catcher is a device for capturing an elimination from a companion animal during the elimination process. The pet excrement catcher comprises an extension shaft, a capture structure, a hinge mechanism, and a grip. The extension shaft is an extension apparatus. The extension shaft is an adjustable structure such that the reach of the pet excrement catcher between a client and the companion animal is adjustable. The capture structure, the hinge mechanism, and the grip attach to the extension shaft. The capture structure is a mechanical structure used to collect the elimination from the companion animal. The hinge mechanism is a mechanical device that controls the operation of the capture structure. The grip is an accommodation that allows the user to manipulate the pet excrement catcher. The grip further illuminates the area around the companion animal.

These together with additional objects, features and advantages of the pet excrement catcher will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet excrement catcher in detail, it is to be understood that the pet excrement catcher is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet excrement catcher.

It is therefore important that the claims be regarded as including such equivalent construction insofar as they do not depart from the spirit and scope of the pet excrement catcher. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a side view of an embodiment of the disclosure.

FIG. 4 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
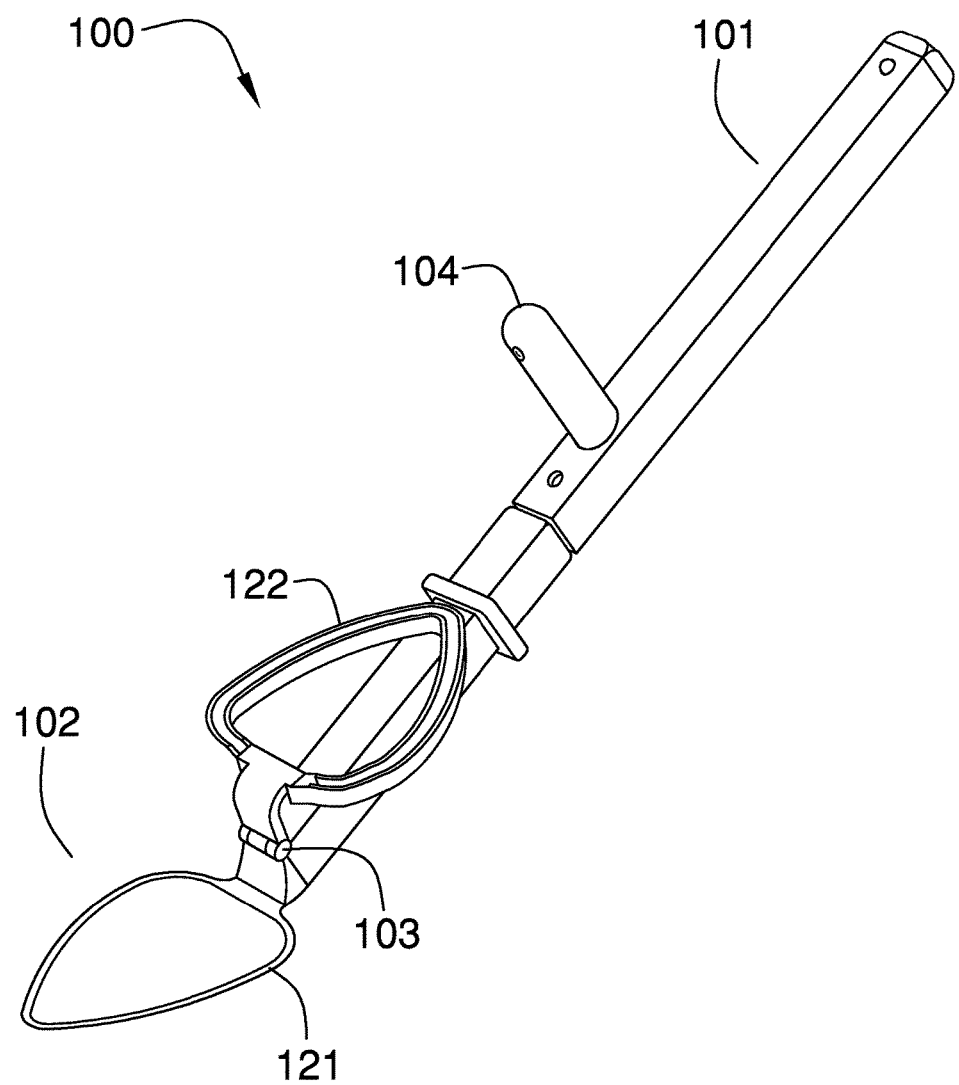
FIG. 1 is a perspective view of an embodiment of the disclosure.
Figure 2:
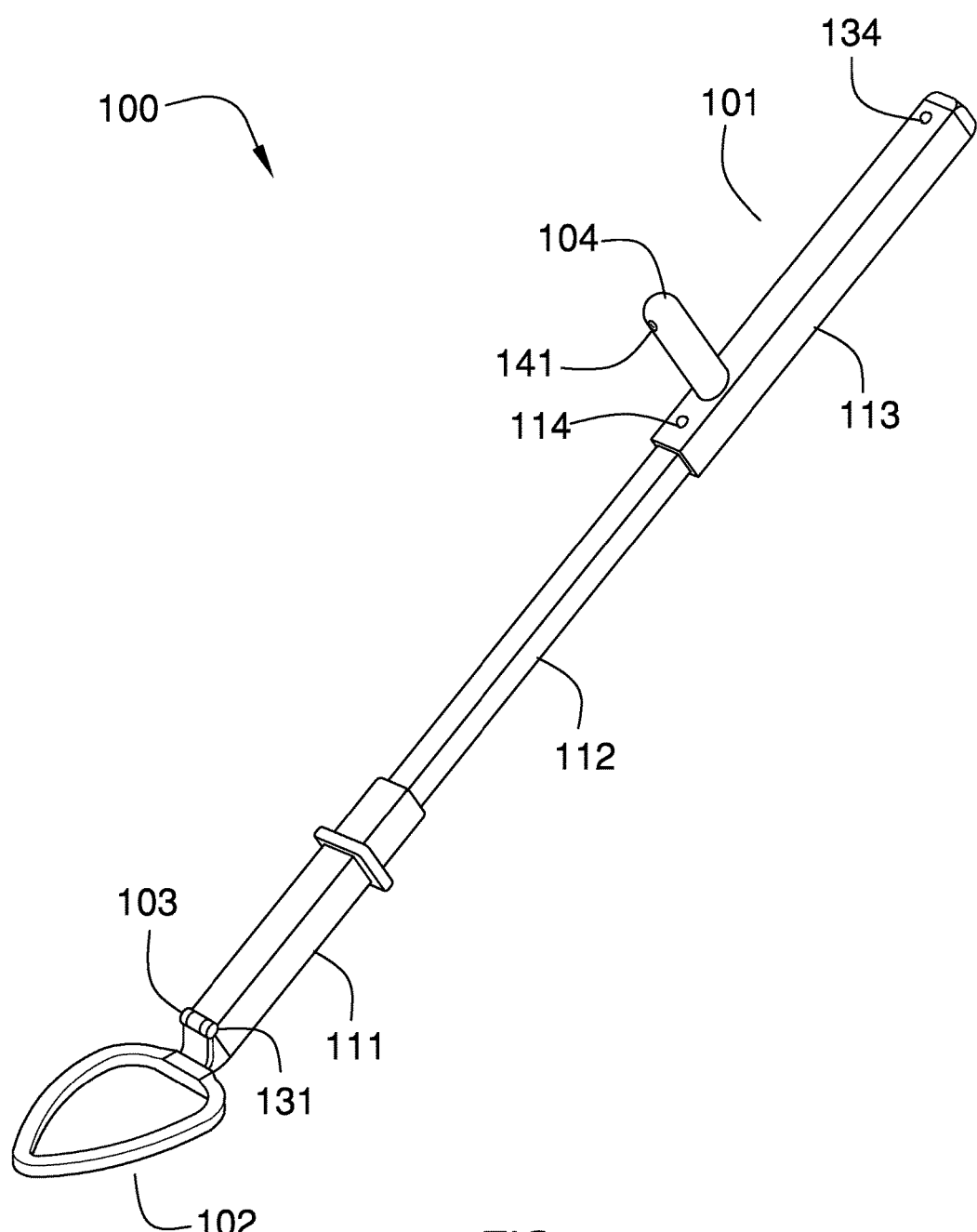
FIG. 2 is a perspective view of an embodiment of the disclosure.
Figure 5:
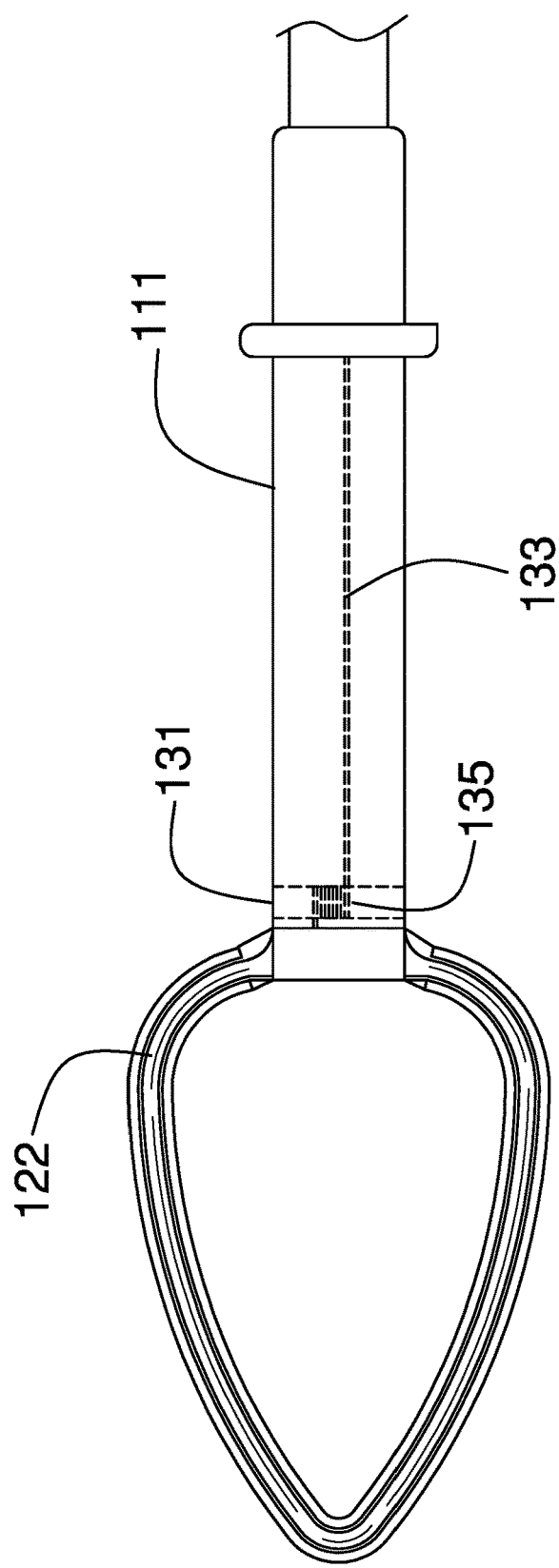
FIG. 5 is a bottom view of an embodiment of the disclosure.
Figure 6:
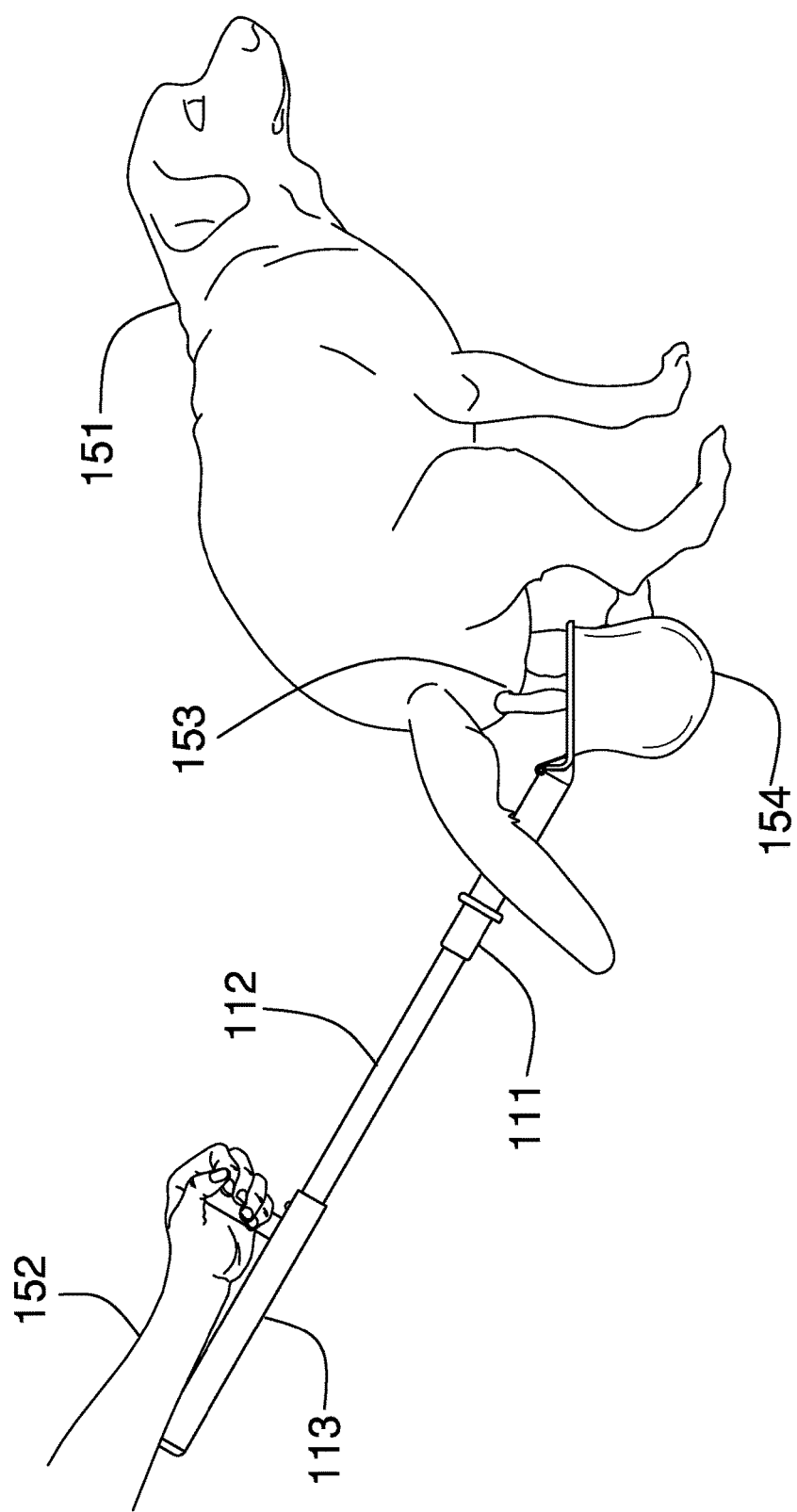
FIG. 6 is an in-use view of an embodiment of the disclosure.

Detailed reference will now be made to one or more potential embodiments of the disclosure, which are illustrated in FIGS. 1 through 6.

The pet excrement catcher 100 (hereinafter invention) is configured for use with a companion animal 151. The invention 100 is a device for capturing an elimination 153 from the companion animal 151 during the elimination 153 process. The invention 100 comprises an extension shaft 101, a capture structure 102, a hinge mechanism 103, and a grip 104. The extension shaft 101 is an extension apparatus. The extension shaft 101 is an adjustable structure such that the reach of the invention 100 between a client 152 and the companion animal 151 is adjustable. The capture structure 102, the hinge mechanism 103, and the grip 104 attach to the extension shaft 101. The capture structure 102 is a mechanical structure used to collect the elimination 153 from the companion animal 151. The hinge mechanism 103 is a mechanical device that controls the operation of the capture structure 102. The grip 104 is an accommodation that allows the client 152 to manipulate the invention 100. The grip 104 further illuminates the area around the companion animal 151.

The companion animal 151 is defined in greater detail elsewhere in this disclosure. The client 152 is defined in greater detail elsewhere in this disclosure. The elimination 153 is a befoulment generated by the companion animal 151. The trash bag 154 is defined in greater detail elsewhere in this disclosure.

The extension shaft 101 is an extension apparatus. The extension shaft 101 forms a composite prism structure. The extension shaft 101 is a telescopic structure. The reach along the center axis of the extension shaft 101 is adjustable. Stated less formally, the reach of the extension shaft 101 between the companion animal 151 and the client 152 is adjustable. The extension shaft 101 comprises an inferior arm 111, a medial arm 112, a superior arm 113, and a detent 114.

The inferior arm 111 is the first of three arms used to form the extension shaft 101. The inferior arm 111 is a prism-shaped structure. The inferior arm 111 forms the segment of the extension shaft 101 that is distal from the client 152.

The medial arm 112 is the second of three arms used to form the extension shaft 101. The medial arm 112 is a prism-shaped structure. Each end of the medial arm 112 is geometrically similar to each end of the inferior arm 111. The span of the length of the perimeter of each end of the medial arm 112 is lesser than the span of the length of the perimeter of each end of the inferior arm 111. The medial arm 112 attaches to the end of the inferior arm 111 that is distal from the capture structure 102. The medial arm 112 attaches to the inferior arm 111 to form a composite prism.

The superior arm 113 is the third of three arms used to form the extension shaft 101. The superior arm 113, the medial arm 112 and the detent 114 combine to form a telescopic structure. The detent 114 connects the medial arm 112 to the superior arm 113. The superior arm 113 is a hollow prism-shaped structure that is further defined with an inner dimension. The medial arm 112 is further defined with an outer dimension. The superior arm 113 and the medial arm 112 are geometrically similar. The outer dimension of the medial arm 112 is less than the inner dimension of the superior arm 113 such that the medial arm 112 can be inserted into the superior arm 113 in a telescopic manner.

The telescopic arrangement of the extension shaft 101 allows the length of the extension shaft 101 to adjust by adjusting the relative position of the medial arm 112 within the superior arm 113. The position of the medial arm 112 relative to the superior arm 113 is held in position using the detent 114. The detent 114 is a mechanical device that connects and secures the superior arm 113 to the medial arm 112. The detent 114 is selected from the group consisting of a cotter pin, a G snap collar, a cam lock collar, a threaded clutch, a split collar lock, or a spring-loaded ball lock.

The capture structure 102 is a mechanical device. The capture structure 102 is a rotating device. The capture structure 102 is configured for use with a trash bag 154. The trash bag 154 attaches to the capture structure 102 such that the trash bag 154 will capture the elimination 153 of the companion animal 151 as the elimination 153 is eliminated from the companion animal 151. The capture structure 102 attaches to the end of the prism structure of the inferior arm 111 that is distal from the client 152. The capture structure 102 comprises a bottom jaw 121 and an upper jaw 122.

The bottom jaw 121 is a loop structure. The bottom jaw 121 attaches to the end of the inferior arm 111 that is distal from the medial arm 112. The bottom jaw 121 is a stationary structure. By stationary is meant the position of the bottom jaw 121 relative to the inferior arm 111 is fixed. The upper jaw 122 is a loop structure. The upper jaw 122 is geometrically similar to the bottom jaw 121. The span of the length of the perimeter of the upper jaw 122 is not significantly different from the span of the length of the perimeter of the bottom jaw 121. The upper jaw 122 is a rotating structure such that the upper jaw 122 rotates from a position of alignment with the bottom jaw 121 to a position parallel to the center axis of the inferior arm 111.

The bottom jaw 121 and the upper jaw 122 secure the trash bag 154 to the extension shaft 101 in preparation for the collection of the elimination 153. The upper jaw 122 combines with the bottom jaw 121 to form a clip that grasps the trash bag 154. The upper jaw 122 and the bottom jaw 121 hold the trash bag 154 in a fixed position relative to the extension shaft 101.

The hinge mechanism 103 is a mechanical device. The hinge mechanism 103 rotates the capture structure 102 to allow for the attachment and the removal of the trash bag 154 to the capture structure 102. The hinge 131 is a rotating structure that attaches the upper jaw 122 to the end of the inferior arm 111 that is distal from the medial arm 112. The hinge mechanism 103 attaches the upper jaw 122 to the inferior arm 111 such that the upper jaw 122 rotates from a position of alignment with the bottom jaw 121 to a position parallel to the center axis of the inferior arm 111. The hinge mechanism 103 comprises a hinge 131, a cord 133, a latch 134, and a spring 135.

The spring 135 is a torsion spring that is deformed by the rotation of the capture structure 102. The spring 135 holds the upper jaw 122 in a position parallel to the center axis of the inferior arm 111 when the spring 135 is in a relaxed shape. The spring 135 is deformed when the upper jaw 122 is in a position of alignment with the bottom jaw 121.

The latch 134 is a mechanical device that holds the spring 135 in a deformed position when the upper jaw 122 is in a position of alignment with the bottom jaw 121. The latch 134 releases the spring 135 to its relaxed shape in order to release the trash bag 154 from the capture structure 102. The cord 133 is a structure that attaches the spring 135 to the latch 134 such that the cord 133 forms a mechanical linkage between the latch 134 and the spring 135.

The grip 104 is an accommodation used by the client 152 to manipulate the extension shaft 101. The grip 104 attaches to the superior arm 113 of the extension shaft 101. The client 152 uses the grip 104 to position the capture structure 102 and the associated trash bag 154 during the capture of the elimination 153. The grip 104 further comprises a flashlight 141. The flashlight 141 is an electrically powered lamp. The flashlight 141 attaches to the grip 104 such that the flashlight 141 generates a field of illumination that allows for the use of the invention 100 in darkness. The flashlight 141 uses one or more LEDs for illumination.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bag: As used in this disclosure, a bag is a container made of a flexible material. The bag has a single opening which allows the bag to receive the items to be contained.

Befoulment: As used in this disclosure, befoulment refers to the excrement and other biological eliminations of a companion animal.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Client: As used in this disclosure, a client is an individual who is designated to receive the services of the disclosure at bar.

Companion Animal: As used in this disclosure, a companion animal is a domesticated animal that is maintained primarily for companionship. A companion animal is often referred to as a pet.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar. Use Prism, pyramid, geometrically similar, truncated, align Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object. Always use Geometrically similar, correspond and one to one Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. Specifically, the sum of the surface areas of two ends of the prism-shaped object that forms the disk is greater than the surface area of the lateral face of the prism-shaped object that forms the disk. In this disclosure, the ends of the prism-shaped structure that forms the disk are referred to as the faces of the disk.

Extension Apparatus: As used in this disclosure, an extension apparatus is a mechanical structure that is used to extend the span of the distance between any two objects or the reach of a first object towards a second object.

Field of Illumination: As used in this disclosure, a field of illumination refers to an area illuminated by electromagnetic radiation projected from an electrical device such as a lamp or transmission antenna.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Ground: As used in this disclosure, the ground is a solid supporting surface formed by the Earth. The term level ground means that the supporting surface formed by the ground is roughly perpendicular to the force of gravity. Always use supporting surface.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object.

Inner Dimension: As used in this disclosure, the term inner dimension describes the span from a first inside or interior surface of a container to a second inside or interior surface of a container. The term is used in much the same way that a plumber would refer to the inner diameter of a pipe.

Intermediate Structure: As used in this disclosure, an intermediate structure refers is an inert structure that attaches a first object to a second object.

Lamp: As used in this disclosure, a lamp is an electrical device that generates visible light to illuminate objects so they can be seen.

Latch: As used in this disclosure, a latch is a fastening or locking mechanism. The use of the term latch does not necessarily but often implies the insertion of an object into a notch or cavity.

LED: As used in this disclosure, an LED is an acronym for a light emitting diode. A light emitting diode is a diode that is also a light source.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

N-gon: As used in this disclosure, an N-gon is a regular polygon with N sides wherein N is a positive integer number greater than 2.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pivot: As used in this disclosure, a pivot is a rod or shaft around which an object rotates or swings.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board or a plank.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Reach: As used in this disclosure, reach refers to a span of distance within which a first object can be grasped, manipulated, or operated by a second object or a person.

Relaxed Shape: As used in this disclosure, a structure is considered to be in its relaxed state when no shear, strain, or torsional forces are being applied to the structure.

Rim: As used in this disclosure, a rim is an outer edge or border that follows along the perimeter of an object.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Trash Bag: As used in this disclosure, a trash bag is a disposable bag formed from a sheeting that is used to contain trash and other refuse for in a manner suitable for disposal. Trash bags are often used to line a waste container.

Truncated: As used in this disclosure, a geometric object is truncated when an apex, vertex, or end is cut off by a line or plane.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A collection device comprising:
an extension shaft, a capture structure, a hinge mechanism, and a grip;
wherein the capture structure, the hinge mechanism, and the grip attach to the extension shaft;
wherein the collection device is adapted for use with a companion animal;
wherein the collection device is a device for capturing an elimination from the companion animal;
wherein the collection device is adapted for use with a client;
wherein the collection device is an extension apparatus that extends the reach between the companion animal and the client;
wherein the hinge mechanism is a mechanical device;

wherein the hinge mechanism is a rotating structure that attaches an upper jaw to the end of an inferior arm that is distal from a medial arm;
wherein the hinge mechanism attaches the upper jaw to the inferior arm such that the upper jaw rotates from a position of alignment with a bottom jaw to a position parallel to the center axis of the inferior arm;
wherein a superior arm, the medial arm, and a detent combine to form a telescopic structure;
wherein the superior arm is a hollow prism-shaped structure that is further defined with an inner dimension;
wherein the medial arm is further defined with an outer dimension;
wherein the superior arm and the medial arm are geometrically similar;
wherein the outer dimension of the medial arm is less than the inner dimension of the superior arm such that the medial arm inserts into the superior arm in a telescopic manner;
wherein the telescopic arrangement of the extension shaft allows the length of the extension shaft adjusts by adjusting the relative position of the medial arm within the superior arm;
wherein the detent is a mechanical device that connects and secures the superior arm to the medial arm;
wherein the extension shaft is an adjustable structure;
wherein the extension shaft adjusts the reach between the client and the companion animal.

2. The collection device according to claim 1
wherein the capture structure is a mechanical structure;
wherein the capture structure collects the elimination from the companion animal.

3. The collection device according to claim 2
wherein the hinge mechanism is a mechanical device;
wherein the hinge mechanism controls the operation of the capture structure.

4. The collection device according to claim 3
wherein the grip is an accommodation that allows the client to manipulate the collection device;
wherein the grip further illuminates the area around the companion animal.

5. The collection device according to claim 4
wherein the extension shaft is an extension apparatus;
wherein the extension shaft forms a composite prism structure;
wherein the extension shaft is a telescopic structure;
wherein the reach along the center axis of the extension shaft is adjustable.

6. The collection device according to claim 5
wherein the capture structure is a mechanical device;
wherein the capture structure is a rotating device;
wherein the capture structure is configured for use with a trash bag;
wherein the trash bag attaches to the capture structure such that the trash bag will capture the elimination of the companion animal as the elimination is eliminated from the companion animal.

7. The collection device according to claim 6
wherein the extension shaft comprises the inferior arm, the medial arm, the superior arm, and the detent;
wherein the inferior arm is the first of three arms used to form the extension shaft;
wherein the medial arm is the second of three arms used to form the extension shaft;
wherein the superior arm is the third of three arms used to form the extension shaft;
wherein the detent connects the medial arm to the superior arm;
wherein the inferior arm is a prism-shaped structure;
wherein the medial arm is a prism-shaped structure;
wherein each end of the medial arm is geometrically similar to each end of the inferior arm;
wherein the span of the length of the perimeter of each end of the medial arm is lesser than the span of the length of the perimeter of each end of the inferior arm;
wherein the medial arm attaches to the inferior arm to form a composite prism;
wherein the medial arm attaches to the end of the inferior arm that is distal from the capture structure.

8. The collection device according to claim 7 wherein the capture structure attaches to the end of the prism structure of the inferior arm that is distal from the client.

9. The collection device according to claim 8
wherein the capture structure comprises a bottom jaw and an upper jaw;
wherein the bottom jaw is a loop structure;
wherein the upper jaw is a loop structure;
wherein the upper jaw is geometrically similar to the bottom jaw;
wherein the span of the length of the perimeter of the upper jaw is not significantly different from the span of the length of the perimeter of the bottom jaw.

10. The collection device according to claim 9
wherein the bottom jaw attaches to the end of the inferior arm that is distal from the medial arm;
wherein the position of the bottom jaw relative to the inferior arm is fixed.

11. The collection device according to claim 10
wherein the upper jaw is a rotating structure;
wherein the upper jaw rotates from a position of alignment with the bottom jaw to a position parallel to the center axis of the inferior arm;
wherein the bottom jaw and the upper jaw secure the trash bag to the extension shaft;
wherein the upper jaw and the bottom jaw hold the trash bag in a fixed position relative to the extension shaft.

12. The collection device according to claim 11
wherein the hinge mechanism comprises a hinge, a cord, a latch, and a spring;
wherein the spring attaches to the hinge;
wherein the cord attaches the spring to the latch.

13. The collection device according to claim 12
wherein the spring is a torsion spring;
wherein the spring is deformed by the rotation of the capture structure.

14. The collection device according to claim 13 wherein the cord forms a mechanical linkage between the latch and the spring.

15. The collection device according to claim 14 wherein the grip attaches to the superior arm of the extension shaft.

16. The collection device according to claim 15
wherein the grip further comprises a flashlight;
wherein the flashlight is an electrically powered lamp;
wherein the flashlight attaches to the grip such that the flashlight generates a field of illumination.

* * * * *